(12) United States Patent
Fujita et al.

(10) Patent No.: US 8,376,456 B2
(45) Date of Patent: Feb. 19, 2013

(54) IMPACT ABSORBING STRUCTURAL BODY, SHELL TYPE FRAME MEMBER AND SEAT STRUCTURE

(75) Inventors: Etsunori Fujita, Hiroshima (JP); Yasuhide Takata, Hiroshima (JP); Yumi Ogura, Hiroshima (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 168 days.

(21) Appl. No.: 12/810,556

(22) PCT Filed: Dec. 22, 2008

(86) PCT No.: PCT/JP2008/073320
§ 371 (c)(1),
(2), (4) Date: Sep. 28, 2010

(87) PCT Pub. No.: WO2009/084505
PCT Pub. Date: Jul. 9, 2009

(65) Prior Publication Data
US 2011/0278901 A1   Nov. 17, 2011

(30) Foreign Application Priority Data
Dec. 27, 2007   (JP) .................. 2007-338226

(51) Int. Cl.
*B60N 2/42*   (2006.01)
(52) U.S. Cl. ............ 297/216.1; 297/452.18; 297/452.65
(58) Field of Classification Search ............... 297/216.1, 297/452.18, 452.65
See application file for complete search history.

(56) References Cited

U.S. PATENT DOCUMENTS

| | | | |
|---|---|---|---|
| 4,350,390 A * | 9/1982 | Ogawa | 297/452.18 |
| 4,601,367 A * | 7/1986 | Bongers | 188/377 |
| 5,514,448 A | 5/1996 | Kishi et al. | |
| 5,669,799 A * | 9/1997 | Moseneder et al. | 442/374 |
| 6,739,673 B2 * | 5/2004 | Gupta et al. | 297/452.65 |
| 6,854,805 B2 | 2/2005 | Fujita et al. | |
| 6,896,324 B1 * | 5/2005 | Kull et al. | 297/216.1 |
| 6,935,672 B2 * | 8/2005 | Dehart | 297/216.1 X |
| 7,070,242 B2 * | 7/2006 | Mears et al. | 297/216.1 X |
| 7,083,230 B2 * | 8/2006 | Kull et al. | 297/216.1 |

(Continued)

FOREIGN PATENT DOCUMENTS

| | | |
|---|---|---|
| JP | 6 87185 | 3/1994 |
| JP | 2000 281803 | 10/2000 |

(Continued)

*Primary Examiner* — Rodney B White
(74) *Attorney, Agent, or Firm* — Oblon, Spivak, McClelland, Maier & Neustadt, L.L.P.

(57) ABSTRACT

To achieve further weight reduction and thinning of a seat structure. A laminated body obtained by sandwiching a planar member 4 made of cloth between planar members 2 and 3 made of synthetic resin to join them to one another via adhesive agent is used in a shell type frame member of the seat structure. Upon receipt of an impact, delamination is caused between the respective layers configuring the laminated body. Thereby, both the tensile stress and the Izod impact strength of the laminated body are lowered as compared with those of a homogeneous laminated body obtained by joining planer members made of homogeneous materials. That is, impact energy is converted to a force causing delamination between the planar members in the laminated body to be consumed, thereby absorbing the impact energy. Since the shell type frame member itself can absorb the impact, further weight reduction and thinning of the shell type frame member and a seat structure using the same can be achieved.

12 Claims, 12 Drawing Sheets

U.S. PATENT DOCUMENTS

| | | | |
|---|---|---|---|
| 7,111,888 B1* | 9/2006 | Dehart | 297/216.1 X |
| 7,128,373 B2* | 10/2006 | Kurtycz et al. | 297/452.65 X |
| 7,134,718 B2 | 11/2006 | Yasuda et al. | |
| 7,716,797 B2* | 5/2010 | Kismarton et al. | 297/452.18 X |
| 7,717,519 B2* | 5/2010 | Kismarton et al. | 297/452.18 |
| 8,016,361 B2* | 9/2011 | Kismarton et al. | 297/452.18 X |
| 8,080,303 B1* | 12/2011 | Dehart | 428/116 |
| 2003/0062759 A1* | 4/2003 | Gupta et al. | 297/452.65 |
| 2003/0116999 A1 | 6/2003 | Fujita et al. | |
| 2004/0178667 A1 | 9/2004 | Fujita et al. | |
| 2004/0239514 A1 | 12/2004 | Takata | |
| 2005/0040690 A1* | 2/2005 | Kurtycz et al. | 297/452.31 |
| 2005/0082896 A1* | 4/2005 | Gupta et al. | 297/452.65 |
| 2005/0231011 A1 | 10/2005 | Fujita et al. | |
| 2005/0248191 A1* | 11/2005 | Azeau | 297/216.1 |
| 2010/0187894 A1* | 7/2010 | Kismarton et al. | 297/452.18 |
| 2011/0057498 A1* | 3/2011 | Fujita et al. | 297/452.18 |

FOREIGN PATENT DOCUMENTS

| | | |
|---|---|---|
| JP | 2003 182427 | 7/2003 |
| JP | 2004 1729 | 1/2004 |
| JP | 2004 141545 | 5/2004 |
| JP | 2004 188164 | 7/2004 |
| JP | 2004 347577 | 12/2004 |
| JP | 2006 77815 | 3/2006 |
| JP | 2007 283758 | 11/2007 |
| JP | 2007 313907 | 12/2007 |
| WO | 2004 007238 | 1/2004 |

* cited by examiner (a)

(b)

IMPACT ABSORBING STRUCTURAL BODY, SHELL TYPE FRAME MEMBER AND SEAT STRUCTURE

TECHNICAL FIELD

The present invention relates to an impact absorbing structural body, a shell type frame member using the impact absorbing structural body at least partially, and a seat structure using the shell type frame member at least partially.

BACKGROUND ART

Patent Documents 1 to 5 disclose seat structures formed by disposing such a cushioning member as a solid knitted fabric (a three-dimensional net material) on a seat cushion frame. When the cushioning member is disposed on the seat cushion frame in this manner, a base net such as a solid knitted fabric or a two-dimensional woven fabric is provided below the cushioning member via an elastic member in order to prevent bottom contact or improve vibration absorbing characteristic or impact absorbing characteristic. All the Patent Documents 1 to 5 disclose that a torsion bar unit provided with a torsion bar, an arm coupled to the torsion bar and supported to be rotatable about the torsion bar, and a supporting frame supported by the arm is disposed at a rear portion of a seat cushion and the base net is elastically supported by coupling a rear end of the base net to the supporting frame.

CITATION LIST

Patent Document 1: Japanese Patent Application Laid-open No. 2004-347577
Patent Document 2: Japanese Patent Application Laid-open No. 2003-182427
Patent Document 3: Japanese Patent Application Laid-open No. 2004-188164
Patent Document 4: Japanese Patent Application Laid-open No. 2004-141545
Patent Document 5: WO2004/007238A1

SUMMARY OF INVENTION

Technical Problem

According to the techniques disclosed in Patent Documents 1 to 5, using the solid knitted fabric, the torsion bar and the like can reduce the weight and the thickness of the seat structure as compared with a seat structure utilizing an urethane member. Further, a spring system and a damper system such as the solid knitted fabric, the torsion bar and the like perform a vibration absorbing action, and the spring system and damper system also mainly function regarding an impact absorbing action. On the other hand, it is necessary to increase the rigidity of a frame system of the seat structure in order to achieve further thinning of the seat structure. However, if so, it becomes necessary to provide a mechanism for absorbing an impact force generated by a rear side collision of a car or the like. If there is not such an impact absorbing mechanism for absorbing an impact force, a force concentrates on a weak point in the seat structure. Therefore, reinforcement for avoiding destruction of the portion must be performed, so that weight increase of the seat structure is caused, even though the thinning has been performed. The need to provide a crushable zone which absorbs an impact force in the seat structure which has been thinned arises in order to avoid the weight increase. In addition, if the solid knitted fabric is thinned or the torsion bar is eliminated, it must be required to perform the impact absorbing action by a member other than the spring system and the damper system.

The present invention has been made in view of the above circumstances, and an object thereof is to provide an impact absorbing structural body which is suitable as a frame member of the seat structure and can contribute to further weight reduction and thinning of the seat structure. Further, another object of the present invention is to provide a shell type frame member and a seat structure which use such an impact absorbing structural body.

Solution to Problem

The present inventors have accumulated investigations keenly in order to achieve the above objects, and consequently they have obtained the following finding. That is, for example, the tensile stress and the Izod impact strength of a homogeneous laminated body obtained by joining two planar members made of homogenous materials to each other should be generally twice those of one planar member. However, the present inventors have obtained the finding that, if a three-layered structure obtained by interposing a heterogeneous planar member in the laminated body made of two homogenous planar members is adopted, when the three-layered structure receives an impact, delamination is caused and the connection regarding strength between the respective planar members configuring the laminated body is damaged, so that both the tensile stress and the Izod impact strength are made lower than those of the homogeneous laminated body obtained by laminating two homogenous members, namely, the tensile stress and the Izod impact strength of the three-layered structure become less than twice those of one planar member. The present invention has been completed based upon the assumption that a force corresponding to the lowering is consumed as a force causing the delamination between the respective layers.

That is, the impact absorbing structural body of the present invention is an impact absorbing structural body comprising a laminated body obtained by laminating at least two layered planar members made of heterogeneous materials, wherein the laminated body is configured such that, by action of delamination caused between respective layers upon receipt of an impact, both the tensile stress and the Izod impact strength of the laminated body regarding at least one tensile direction of a vertical direction, a lateral direction and an oblique direction are lowered as compared with those of a homogeneous laminated body obtained by laminating a planar member made of a homogeneous material on either of the planar members used in the laminated body, and lowering rates of the tensile stress and the Izod impact strength are 40% or less.

Preferably, the laminated body comprises at least three layered planar members and one layer of these layered planar members is different in material from the other layered planar members. Preferably, the lowering rates are in a range from 20% to 40%. Preferably, as compared with the homogeneous laminated body, both the tensile strength and the Izod impact strength of the laminated body regarding all tensile directions of the vertical direction, the lateral direction and the oblique direction are lowered. Preferably, the laminated body comprises a laminated body of planar members made of synthetic resin and a planar member made of cloth. Preferably, the laminated body has such a structure that the planar member made of cloth is sandwiched between the planar members made of synthetic resin. Preferably, the planar members configuring the laminated body are joined to each other through adhesive agent. A bi-axial woven fabric, a tri-axial woven fabric, a tetra-axial woven fabric, or a three-dimensional solid knitted fabric can be used as the planar member made of cloth and the planar member made of cloth is more preferably the bi-axial woven fabric. Preferably, an undulation portion is formed on the laminated body and further preferably, a portion of the planar member made of cloth positioned at the undulation portion has a length longer than the circumferential length of a region where the undulation portion is formed and lamination is performed in a state in which an excess portion has been generated.

A shell type frame member of the present invention is a shell type frame member in a seat structure, the shell type frame member using an impact absorbing structural body at least partially, wherein the impact absorbing structural body comprises a laminated body obtained by laminating at least two layered planar members made of heterogeneous materials, and the laminated body is configured such that, by action of delamination caused between respective layers upon receipt of an impact, both the tensile stress and the Izod impact strength of the laminated body regarding at least one tensile direction of a vertical direction, a lateral direction and an oblique direction are lowered as compared with those of a homogeneous laminated body obtained by laminating a planar member made of a homogeneous material on either of the planar members used in the laminated body, and lowering rates of the tensile stress and the Izod impact strength are 40% or less.

A seat structure of the present invention is a seat structure where an impact absorbing structural body is used in at least one portion of a shell type frame structure, wherein the impact absorbing structural body comprises a laminated body obtained by laminating at least two layered planar members made of heterogeneous materials, and the laminated body is configured such that, by action of delamination caused between respective layers upon receipt of an impact, both the tensile stress and the Izod impact strength of the laminated body regarding at least one tensile direction of a vertical direction, a lateral direction and an oblique direction are lowered as compared with those of a homogeneous laminated body obtained by laminating a planar member made of a homogeneous material on either of the planar members used in the laminated body, and lowering rates of the tensile stress and the Izod impact strength are 40% or less. Preferably, the seat structure is a seat for a transport machine.

Advantageous Effects of Invention

The impact absorbing structural body of the present invention is a structure which comprises the laminated body obtained by joining at least two layered planer members made of heterogeneous materials, wherein delamination is caused between respective layers configuring the laminated body upon receipt of an impact, and both the tensile stress and the Izod impact strength of the laminated body are lowered as compared with those of a homogeneous laminated body obtained by joining planar members made of homogeneous materials to each other. That is, impact energy is easy to locally concentrate on a coupled site of parts, for example, a connecting site utilizing a recliner or the like in the case of a seat structure, but the present invention consumes the impact energy as a force for delaminating the planar members of the laminated body from each other, thereby relaxing the local concentration and achieving dissipation of the impact energy over a wide face. Accordingly, since the shell type frame member itself can absorb an impact by using the impact absorbing structural body as the shell type frame member, further weight reduction and thinning of the shell type frame member and the seat structure using the shell type frame member can be achieved. However, since it is necessary to cause a dissipation phenomenon of impact energy based upon delamination while it is necessary to provide a site which receives a large load accompanying an impact, it is preferable to adopt such a structure that such delamination is partially caused in the shell type frame member.

Incidentally, it is preferable that the present invention adopts a laminated body having a three-layered structure where a heterogeneous planar member is interposed between two homogeneous laminated bodies, since the three-layered structure easily causes the dissipation phenomenon of impact energy due to delamination. Particularly, it is preferable that a configuration where the planar member made of cloth is sandwiched between the planar members made of synthetic resin is adopted, where these planar members are joined to one another through adhesive agent. Further, since formation of the undulation portion on the laminated body easily causes delamination in the vicinity of the undulation portion upon receipt of an impact, it becomes easy to set a site receiving the abovementioned load and a site absorbing energy through the delamination arbitrarily. Furthermore, it is preferable that, when a member having a length longer than the circumferential length of a region where the undulation portion is formed is used as the planar member made of cloth and lamination is performed in a state in which an excess portion has been generated, since delamination in the vicinity of the undulation portion is further easily caused.

REFERENCE SIGNS LIST

| | |
|---|---|
| 1: | impact absorbing structural body |
| 2, 3: | planar member made of synthetic resin |
| 4: | planar member made of cloth |
| 10: | seat structure |
| 20: | seat cushion section |
| 21: | side frame cover |
| 30: | seat back section |
| 31: | shell type frame member |
| 31a: | undulation portion |

DESCRIPTION OF EMBODIMENTS

Figure 1:
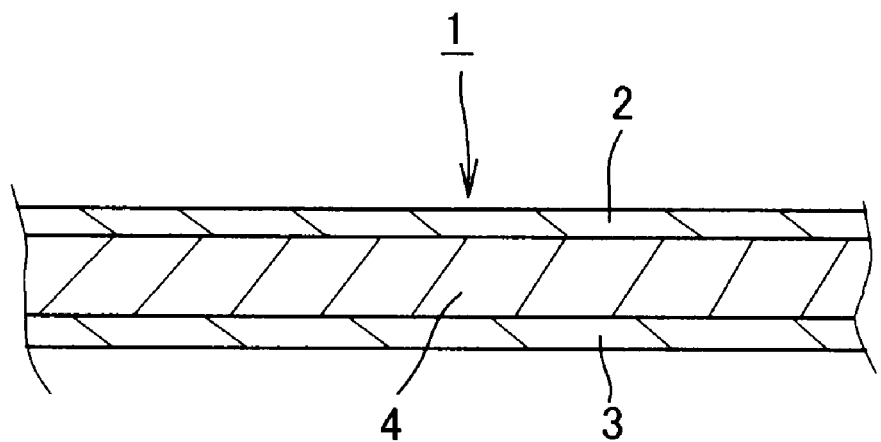
FIG. 1 is a partially sectional view showing an impact absorbing structural body according to an embodiment of the present invention.

Hereinafter, embodiments of the present invention will be further explained in detail with reference to the drawings. FIG. 1 is a partially sectional view showing one example of an impact absorbing structural body 1 according to an embodiment. As shown in FIG. 1, the impact absorbing structural body 1 of the embodiment comprises a laminated body in which a planar member 4 made of cloth is sandwiched between two planar members 2 and 3 made of synthetic resin. Joining of one planar member 2 and the planar member 4 made of cloth, and joining of the planer member 4 made of cloth and the other planar member 3 are performed via adhesive agent, respectively.

For example, members made of thermosetting resin such as unsaturated polyester resin can be used as the planar members 2 and 3 made of synthetic resin. Further, fiber-reinforced plastic obtained by adding glass fibers or the like in thermosetting resin such as unsaturated polyester resin can be used. It is preferable that the planar member 4 made of cloth is selected from a group consisting of a bi-axial woven fabric, a tri-axial woven fabric, a tetra-axial woven fabric or a three-dimensional solid knitted fabric. Particularly, it is more preferable that the bi-axial woven fabric is used. The reason why the bi-axial woven fabric is preferred will be explained in detail in Test Examples described later. Incidentally, the three-dimensional solid knitted fabric is one knitted by reciprocating a connecting strand between a pair of ground knitted fabrics positioned at a predetermined interval and it is formed by using a double raschel machine or the like, and in this case, one having a thickness in a range from 2 to 6 mm is preferably used and one having a thickness in a range from 2 to 4 mm is more preferably used in this embodiment. Further, the impact absorbing structural body 1 can be manufactured, for example, by molding the planar members 2 and 3 made of synthetic resin in advance and performing joining of one planar member 2 and the planar member 4 made of cloth and joining of the planar member 4 made of cloth and the other planar member 3 through adhesive agent, respectively. Furthermore, the impact absorbing structural body 1 can be manufactured by bonding fibers to both faces of the planar member 4 made of cloth via adhesive agent and laminating synthetic resin materials on the fibers. Incidentally, synthetic rubber adhesive agent or thermosetting adhesive agent can be used as the adhesive agent, for example.

Figure 2:
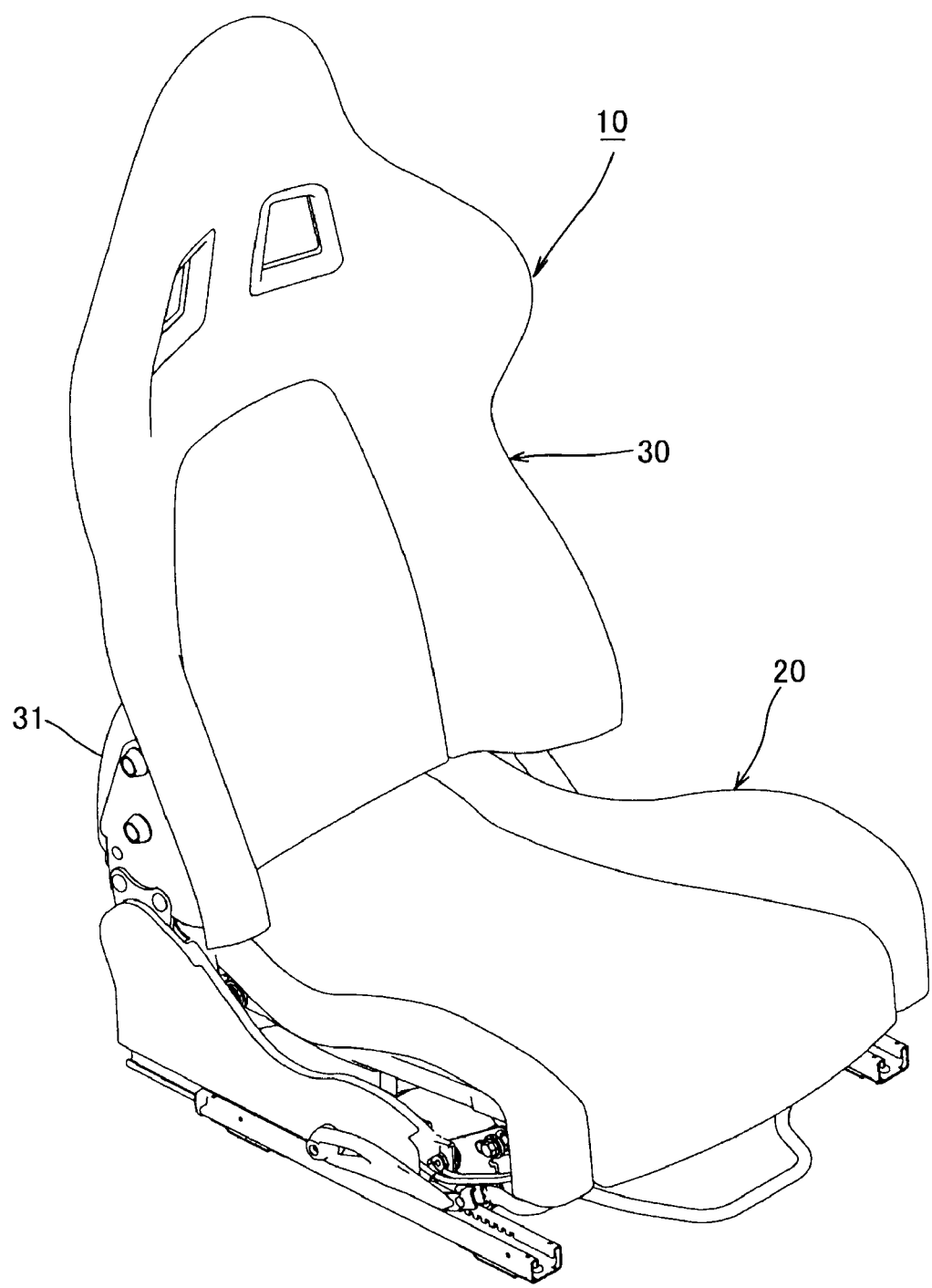
FIG. 2 is a perspective view showing a seat structure for an automobile provided with a seat cushion section and a seat back section using the impact absorbing structural body of the embodiment.
Figure 3:
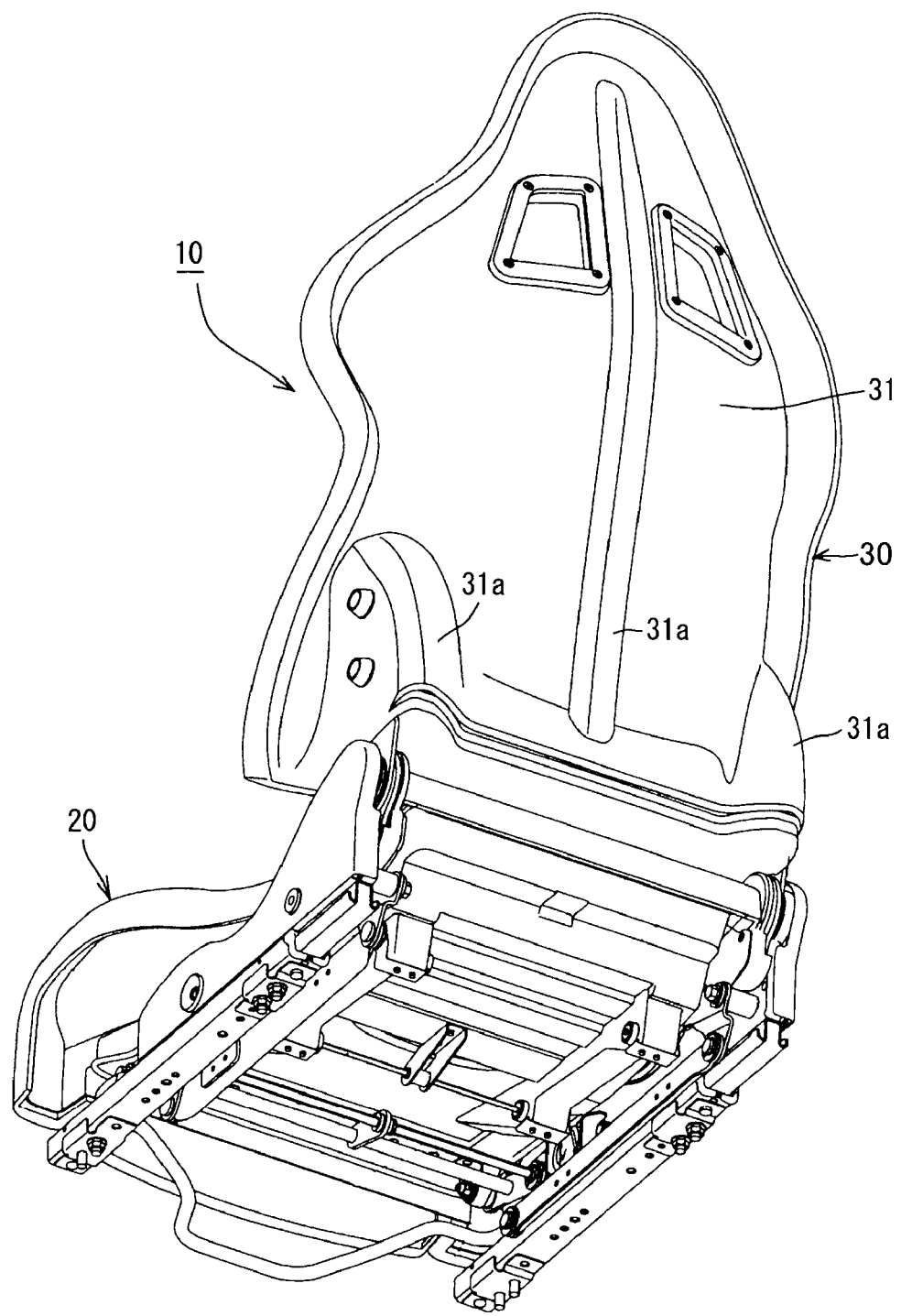
FIG. 3 is a perspective view viewed from a back face direction of the seat structure shown in FIG. 2.

FIG. 2 and FIG. 3 are views showing a seat structure 10 for an automobile provided with a seat cushion section 20 and a seat back section 30. This seat structure 10 is a bucket type seat structure, and the seat back section 30 is formed by covering a shell type frame member 31 formed by bending a plate-shaped member with a skin member such as a solid woven fabric. In this embodiment, the configuration of the impact absorbing structural body 1 shown in FIG. 1 is adopted as the shell type frame member 31. That is, the shell type frame member 31 of this embodiment comprises the planar members 2 and 3 made of synthetic resin and the planar member 4 made of cloth formed of a bi-axial woven fabric and sandwiched between both the planar members 2 and 3 through adhesive agent. Incidentally, as shown in FIG. 2 and FIG. 3, in the case of the shell type frame member 31 used in the seat structure 10, it is preferable that the thickness of the laminated body comprising the planar members 2 and 3 made of synthetic resin and the planar member 4 made of cloth is set in a range from 1 to 4 mm in order to obtain a desired strength.

Figure 4:
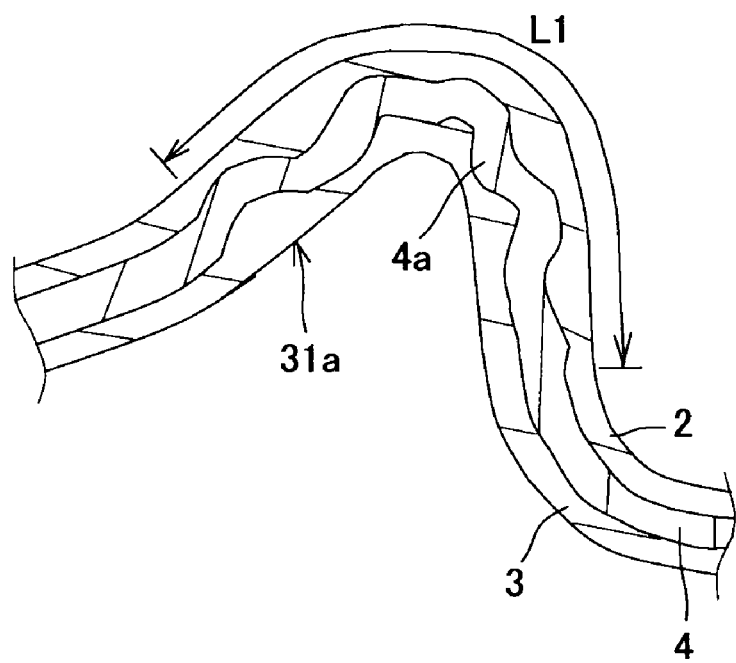
FIG. 4 is a sectional view in an undulation portion of a shell type frame member adopting the impact absorbing structural body of the embodiment.

Further, since the shell type frame member 31 is thin, as shown in FIG. 2 and FIG. 3, it is preferable that a configuration in which strength is secured by forming an undulation portion 31a at a proper site to elevate a section modulus is adopted. Further, as shown in FIG. 4, in a range where the undulation portion 31a is formed, it is preferable that the length of the planar member 4 made of cloth is longer than a circumferential length L1 of the range, so that lamination is performed in a state in which an excess portion (a slack portion) 4a has been formed. Thereby, when the undulation portion 31a is pressed in a thickness direction thereof upon receipt of an impact, the excess portion 4a is forced to stretch, so that the planar member 4 made of cloth can be delaminated from the respective planar members 2 and 3 made of synthetic resin in the vicinity of the undulation portion 31a more reliably.

Test Example 1

A laminated body (Test Example 1) was manufactured by sandwiching a bi-axial woven fabric (Longitudinal: 20/inch, Horizontal: 20/inch) formed from polyethylene naphthalate (PEN) fibers (1100 dtex) produced by Teijin Limited between fiber-reinforced plastics containing unsaturated polyester resin for general lamination (Product Name: [POLYKYUTO PC-420 TN] produced by Kyushu Toryo Kogyo Co., Ltd.) as matrix. Specifically, molding was made by joining glass fibers which were reinforcing material to both faces of the bi-axial woven fabric by synthetic rubber adhesive agent (Trade Name: AIRTAC 2, spraying type synthetic rubber adhesive agent, manufactured by Airtech Corporation, USA) and laminating unsaturated polyester resin for general lamination on the glass fibers. Test pieces were prepared from this laminated body. As the test pieces, ones in which a taking-up direction (a roll direction) of a roll of a bi-axial woven fabric provided in a rolled state was a tensile direction, ones in which an oblique direction (a bias direction) was the tensile direction, and ones in which a widthwise direction was the tensile direction ware prepared in threes (n1, n2, n3). The tensile stress and the Izod impact strength of each test piece were obtained. The tensile stress was measured by the tensile test specified in JIS K7113. As the test pieces used in the tensile test, ones specified in JIS K7139 (Citation Standard ISO 527-2) were prepared. The Izod impact strength was measured by Izod Impact Test specified in JIS K7110. As the test pieces used in Izod Impact Test, ones specified JIS K7139

(Citation Standard ISO 180) were prepared. The tensile stresses are as shown in Table 1. Incidentally, in Table 1, "t" denotes the thickness of each test piece (the thickness as the laminated body) and "Wc" denotes the width of each test piece. Table 2 shows a tensile stress of a laminated body obtained by laminating planar members made of synthetic resin without intervening a bi-axial woven fabric therebetween, specifically, a laminated body (a homogeneous laminated body (Comparative Example 1)) molded by joining glass fibers to each other using the same adhesive agent as described above and laminating unsaturated polyester resin for general lamination on them.

TABLE 1

| Test Example | roll direction | | | bias direction | | | widthwise direction | | |
|---|---|---|---|---|---|---|---|---|---|
| 1 | n1 | n2 | n3 | n1 | n2 | n3 | n1 | n2 | n3 |
| P: breaking load: N | 1411.9 | 1218.8 | 1275.1 | 1166.5 | 1049.9 | 1102.2 | 1126.3 | 1150.4 | 961.4 |
| t: plate thickness: mm | 2.65 | 2.45 | 2.35 | 2.35 | 2.35 | 2.10 | 1.90 | 1.90 | 1.75 |
| Wc: width: mm | 10.05 | 10.05 | 9.90 | 10.05 | 10.00 | 10.05 | 10.15 | 10.15 | 10.15 |
| $\sigma_{LB}$: tensile strength: MPa | 53.0 | 49.5 52.4 | 54.8 | 49.4 | 44.7 48.8 | 52.2 | 58.4 | 59.7 57.4 | 54.1 |

TABLE 2

| | Comparative Example 1 roll direction | | |
|---|---|---|---|
| | n1 | n2 | n3 |
| P: breaking load: N | 1150.4 | 1202.7 | 1319.4 |
| t: plate thickness: mm | 1.50 | 1.65 | 1.70 |
| Wc: width: mm | 9.95 | 10.00 | 10.00 |
| $\sigma_{LB}$: tensile strength: MPa | 77.1 | 72.9 75.9 | 77.6 |

FIGS. 5A to 5C are graphs of results of tensile stresses in Table 1, where an average tensile stress of three test pieces is also obtained in each direction. FIG. 5D is a graph of a tensile stress in Table 2. Incidentally, since the homogeneous laminated body shown in FIG. 5D does not include the bi-axial woven fabric intervened therein and a cut-out test piece does not have directionality, measurement about three test pieces cut out with the same size as the above without considering the cutting-out direction is performed and an average value of the values obtained by the measurement is obtained.

Figure 5:
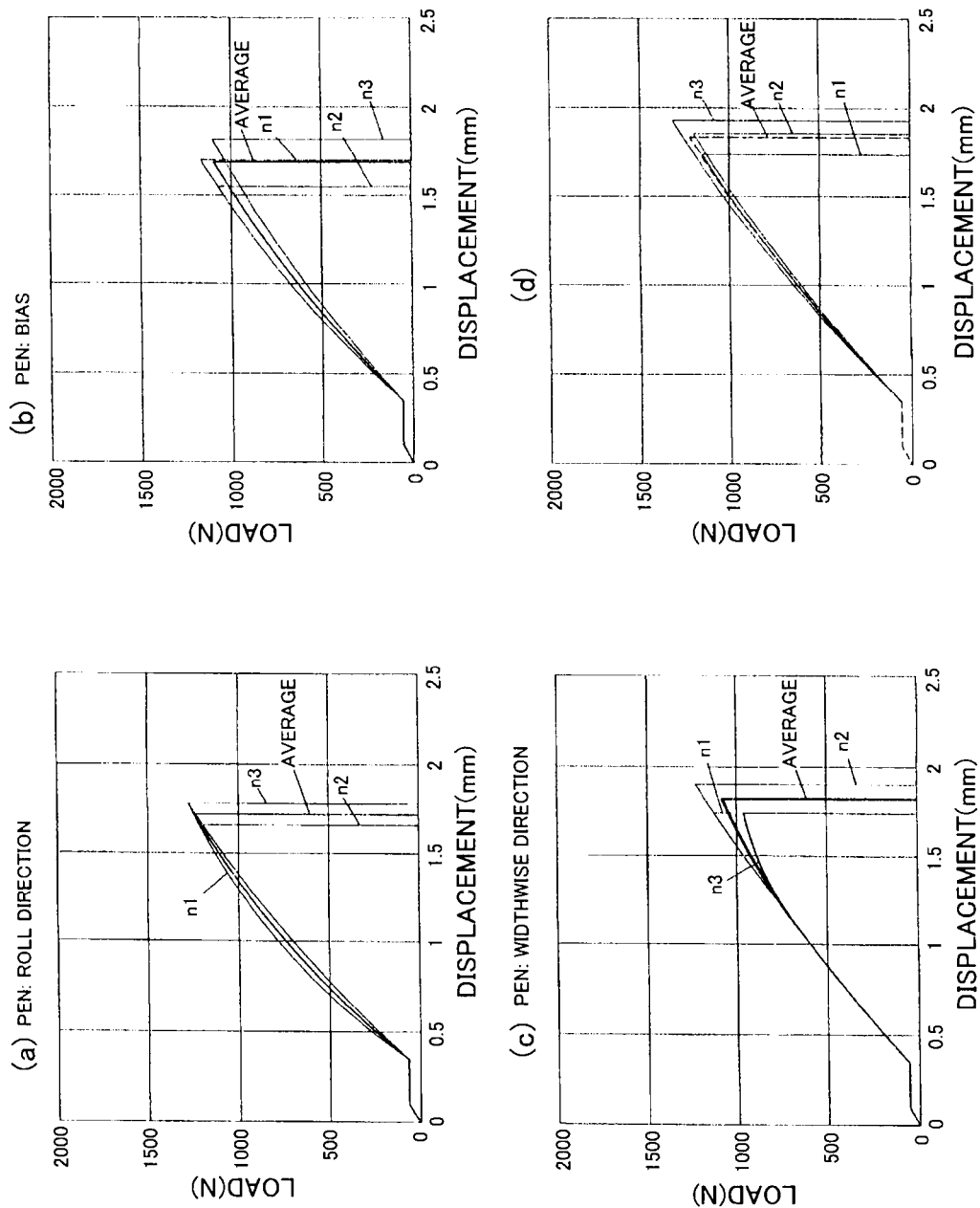
FIGS. 5A to 5C are graphs showing results of tensile stresses of respective test pieces in Test Example 1.
FIG. 5D is a graph showing tensile stresses of respective test pieces in Comparative Example 1.
Figure 6:
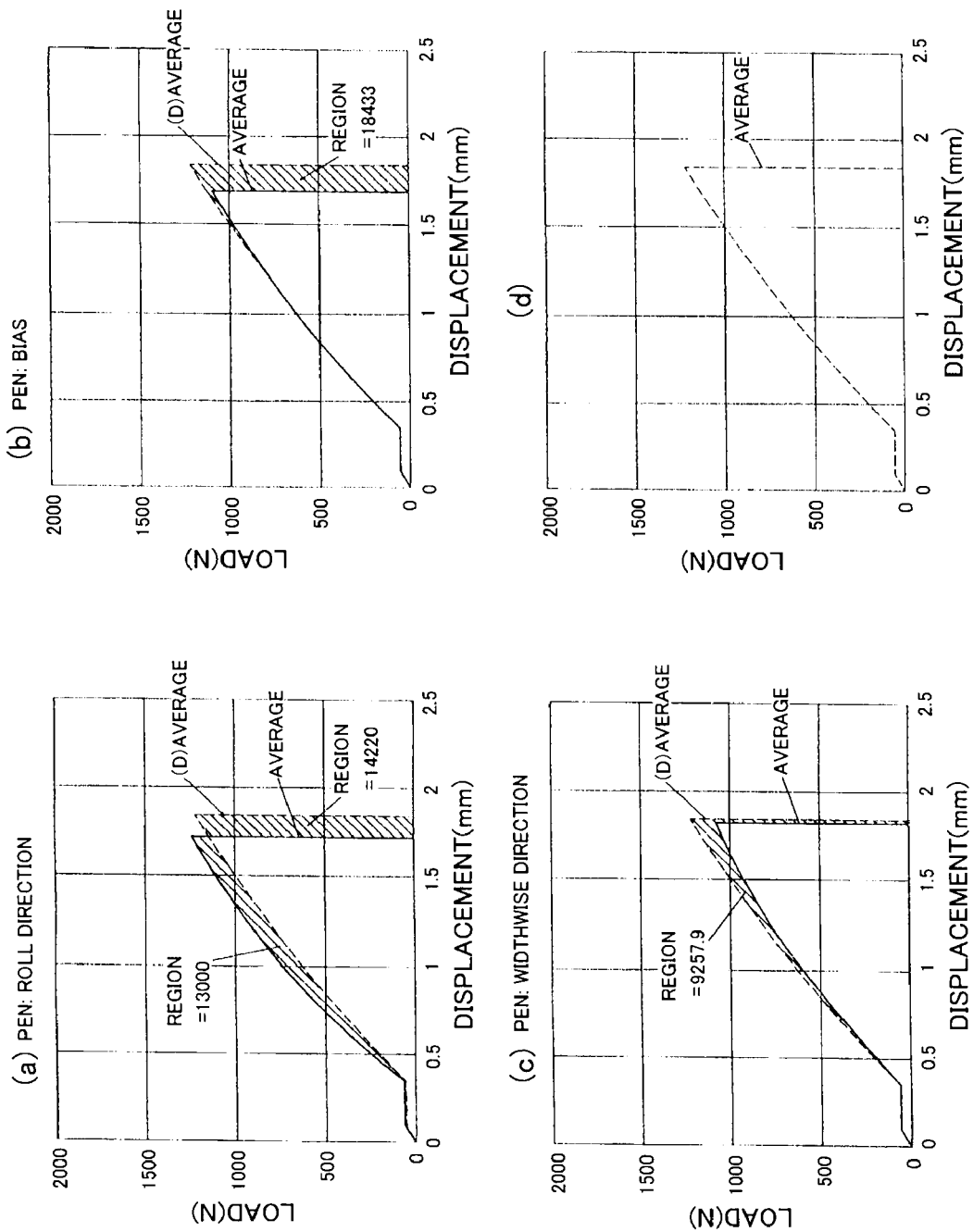
FIGS. 6A to 6D are graphs showing only average values taken from FIGS. 5A to 5D.

FIG. 6 is a graph showing only respective average values taken out of FIG. 5. Particularly, FIGS. 6A to 6C display the respective average values together with the average value of the homogeneous laminated body shown in FIG. 6D.

In the above results, it was first found from Table 1 and Table 2 that, while the tensile stress of the homogeneous laminated body of Comparative Example 1 was 75.9 MPa in the roll direction, the tensile stress of the laminated body of Test Example 1 was 52.4 MPa in the roll direction, 48.8 MPa in the bias direction and 57.4 MPa in the widthwise direction according to the average value of the respective test pieces, and the lowering rates thereof were 31.0%, 35.7% and 24.4%, respectively. The fact that the tensile stress of the heterogeneous laminated body formed by performing lamination using adhesive agent through the bi-axial woven fabric becomes smaller than that of the homogeneous laminated body shows that delamination was caused between the bi-axial woven fabric and each fiber-reinforced plastic (glass fiber), and the lowered tensile stress corresponds to absorbed impact energy. As compared with the homogeneous laminated body, it was found from FIG. 6 that the energy absorbing amount of each test piece in Test Example 1 was 1220 N·mm in the roll direction shown in FIG. 6A, 18433 N·mm in the bias direction shown in FIG. 6B and 9257.9 N·mm in the widthwise direction shown in FIG. 6C.

On the other hand, as shown in Table 3 and Table 4, it was found that, while the Izod impact strength of the homogeneous laminated body in Comparative Example 1 was 46.9 kJ/m², the Izod impact strength of the laminated body in Test Example 1 was 33.7 kJ/m² in the roll direction, 31.9 kJ/m² in the bias direction and 28.8 kJ/m² in the widthwise direction, and the lowering rates thereof were 28.1%, 32.0% and 38.6%, respectively. Accordingly, it was found that the laminated body of Test Example 1 was lower in Izod impact strength than the homogeneous laminated body of Comparative Example 1 and the lowered amount of the Izod impact strength contributed to absorbing impact energy.

TABLE 3

| Test Example | roll direction | | | bias direction | | | widthwise direction | | |
|---|---|---|---|---|---|---|---|---|---|
| 1 | n1 | n2 | n3 | n1 | n2 | n3 | n1 | n2 | n3 |
| E: impact energy: deg | 136.5 | 137.0 | 139.0 | 137.5 | 139.5 | 139.5 | 142.0 | 140.5 | 139.0 |
| E: impact energy: J | 0.8070 | 0.7714 | 0.6331 | 0.7365 | 0.5995 | 0.5995 | 0.4358 | 0.5331 | 0.6331 |
| t: plate thickness: mm | 2.10 | 2.35 | 2.10 | 2.05 | 2.00 | 2.00 | 1.85 | 1.80 | 1.90 |
| Wc: width: mm | 10.00 | 10.10 | 10.00 | 10.05 | 10.00 | 10.00 | 10.00 | 10.00 | 10.00 |
| $a_{iu}$: impact strength: kJ/m² | 38.4 | 32.5 33.7 | 30.1 | 35.7 | 30.0 31.9 | 30.0 | 23.6 | 29.6 28.8 | 33.3 |

TABLE 4

| | Comparative Example 1 roll direction | | |
|---|---|---|---|
| | n1 | n2 | n3 |
| E: impact energy: deg | 137.0 | 134.0 | 133.5 |
| E: impact energy: J | 0.7714 | 0.9888 | 1.0261 |
| t: plate thickness: mm | 1.90 | 1.95 | 2.05 |
| Wc: width: mm | 10.05 | 10.05 | 10.05 |
| $a_{iu}$: impact strength: kJ/m$^2$ | 40.4 | 50.5 46.9 | 49.8 |

Test Example 2

A laminated body (Test Example 2) formed by sandwiching a tetra-axial woven fabric formed using aramid fiber (Trademark "TECHNORA" produced by TEIJIN TECHNO PRODUCTS LIMITED) instead of the bi-axial woven fabric of Test Example 1 was manufactured. In Test Example 2, ones in which a direction extending along a taking-up direction (a roll direction) of a roll of the tetra-axial woven fabric was the tensile direction, ones in which an oblique direction (a bias direction) was the tensile direction and ones in which a widthwise direction was the tensile direction were prepared in threes (n1, n2, n3). The tensile stress and the Izod impact strength of each test piece were obtained. The standard of the test pieces and a method of each test were exactly the same as those of Test Example 1. Table 5 shows the result of tensile stresses obtained from the tensile test.

TABLE 5

| Test Example | roll direction | | | bias direction | | | widthwise direction | | |
|---|---|---|---|---|---|---|---|---|---|
| 2 | n1 | n2 | n3 | n1 | n2 | n3 | n1 | n2 | n3 |
| P: breaking load: N | 1971.038 | 1432.019 | 1657.281 | 1818.182 | 1613.033 | 1637.168 | 1383.749 | 1347.546 | 1182.623 |
| t: plate thickness: mm | 2.45 | 2.25 | 2.40 | 2.50 | 2.30 | 2.00 | 2.10 | 2.10 | 2.00 |
| Wc: width: mm | 10.15 | 10.00 | 10.00 | 10.05 | 10.05 | 9.95 | 10.05 | 10.05 | 10.00 |
| $\sigma_{tB}$: tensile strength: MPa | 79.3 | 63.6 70.7 | 69.1 | 72.4 | 69.8 74.8 | 82.3 | 65.6 | 63.8 62.8 | 59.1 |

The tensile stress of the homogeneous laminated body of Comparative Example 1 was 75.9 MPa (see Table 2), but it was found from Table 5 that the tensile stress of the laminated body of Test Example 1 was 70.7 MPa in the roll direction, 74.8 MPa in the bias direction and 62.8 MPa in the widthwise direction according to the average value of the respective test pieces and the lowering rates were 6.9%, 1.4% and 17.3%, respectively. In Test Example 2, it was found that the tensile stress of the heterogeneous laminated body obtained by performing lamination of the tetra-axial woven fabric using adhesive agent was smaller than the tensile stress of the homogeneous laminated body, where delamination was caused between the tetra-axial woven fabric and each fiber-reinforced plastic (glass fiber) and impact energy could be absorbed corresponding to the lowed tensile stress.

However, when the laminated body including the intervened bi-axial woven fabric of Test Example 1 and the laminated body including the intervened tetra-axial woven fabric of Test Example 2 are compared with the homogeneous laminated body of Comparative Example 1 regarding the lowering rate of the tensile stress, the lowering rate of the laminated body including the intervened bi-axial woven fabric is larger than that of the laminated body including the intervened tetra-axial woven fabric, so that it can be said that the laminated body including the intervened bi-axial woven fabric is more preferable than the laminated body including the intervened tetra-axial woven fabric regarding absorption of impact energy.

However, in both the laminated body of Test Example 1 including the intervened bi-axial woven fabric and the laminated body of Test Example 2 including the intervened tetra-axial woven fabric, their tensile stresses are lower than that of the homogeneous laminated body of Comparative Example 1, where the lowering rate of Test Example 1 falls within a range from 24.4 to 35.7% and the lowering rate of Test Example 2 falls within a range from 1.4 to 17.3%. Since it is thought that, when the lowering rate largely exceeds 40%, strength is too low, the lowering rate is preferably 40% or less, more preferably, in a range from 20 to 40% including the range of the lowering rate of the bi-axial woven fabric.

On the other hand, as shown in Table 6, the Izod impact strength of the laminated body of Test Example 2 was 44.1 kJ/m$^2$ in the roll direction, 48.3 kJ/m$^2$ in the bias direction and 49.6 kJ/m$^2$ in the lateral direction. Regarding the roll direction, the Izod impact strength of the laminated body of Test Example 2 was made lower than the Izod impact strength: 46.9 kJ/m$^2$ (see Table 4) of the homogeneous laminated body of Comparative Example 1 by 6.0%, but the Izod impact strength of the laminated body of Test Example 2 regarding the bias direction and the lateral direction exceeded that of the homogeneous laminated body of Comparative Example 1. In both the tests of the tensile stress and the Izod impact strength, therefore, the laminated body of Test Example 1 using the bi-axial woven fabric where the values of the tensile stress and the Izod impact strength are lower than those of the homogeneous laminated body of Comparative Example 1 can develop an impact absorbing function due to delamination more securely. Particularly, damage to a person can be reduced in a rear collision accident. Incidentally, when the lowering rate of the Izod impact strength is too low, strength required originally may not be maintained, so that the lowering rate is preferably 40% or less, more preferably in a range from 20 to 40% including the lowering rate (28.1 to 38.6%) of the bi-axial woven fabric.

TABLE 6

| Test Example 2 | roll direction | | | bias direction | | | widthwise direction | | |
|---|---|---|---|---|---|---|---|---|---|
| | n1 | n2 | n3 | n1 | n2 | n3 | n1 | n2 | n3 |
| E: impact energy: deg | 135.0 | 132.5 | 132.0 | 133.0 | 131.0 | 135.5 | 132.0 | 135.0 | 133.5 |
| E: impact energy: J | 0.9150 | 1.1017 | 1.1400 | 1.0638 | 1.2174 | 0.8788 | 1.1400 | 0.9150 | 1.0261 |
| t: plate thickness: mm | 2.20 | 2.55 | 2.40 | 2.00 | 2.30 | 2.25 | 1.95 | 2.10 | 2.20 |
| Wc: width: mm | 10.00 | 10.00 | 10.00 | 10.00 | 10.05 | 10.00 | 10.00 | 10.00 | 10.00 |
| $a_{iu}$: impact strength: kJ/m² | 41.6 | 43.2 44.1 | 47.5 | 53.2 | 52.7 48.3 | 39.1 | 58.5 | 43.6 49.6 | 46.6 |

Figure 7:
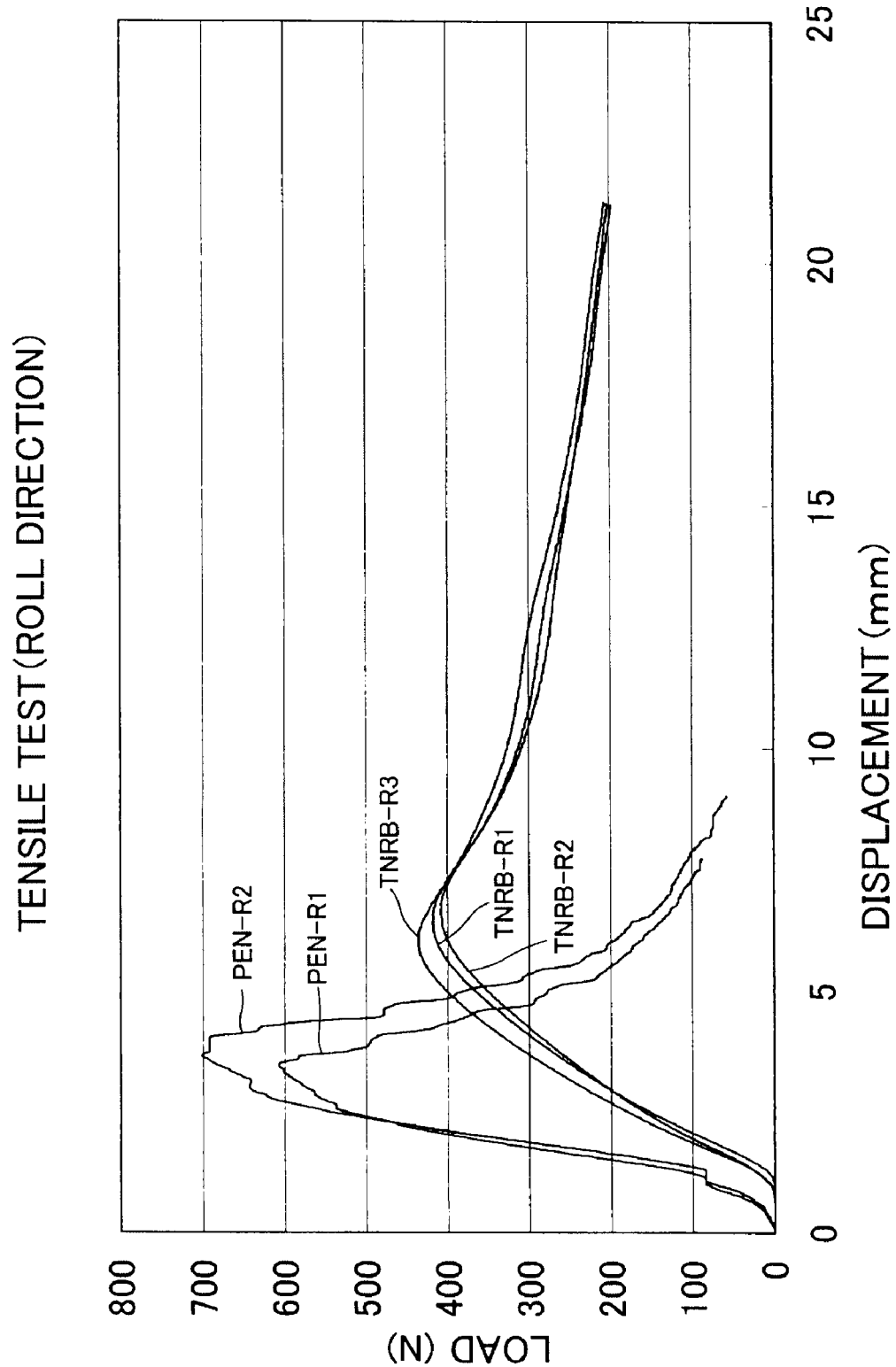
FIG. 7 is a graph showing a result of tensile tests in a roll direction of a bi-axial woven fabric single body and a tetra-axial woven fabric single body used in Test Example 1 and Test Example 2.
Figure 8:
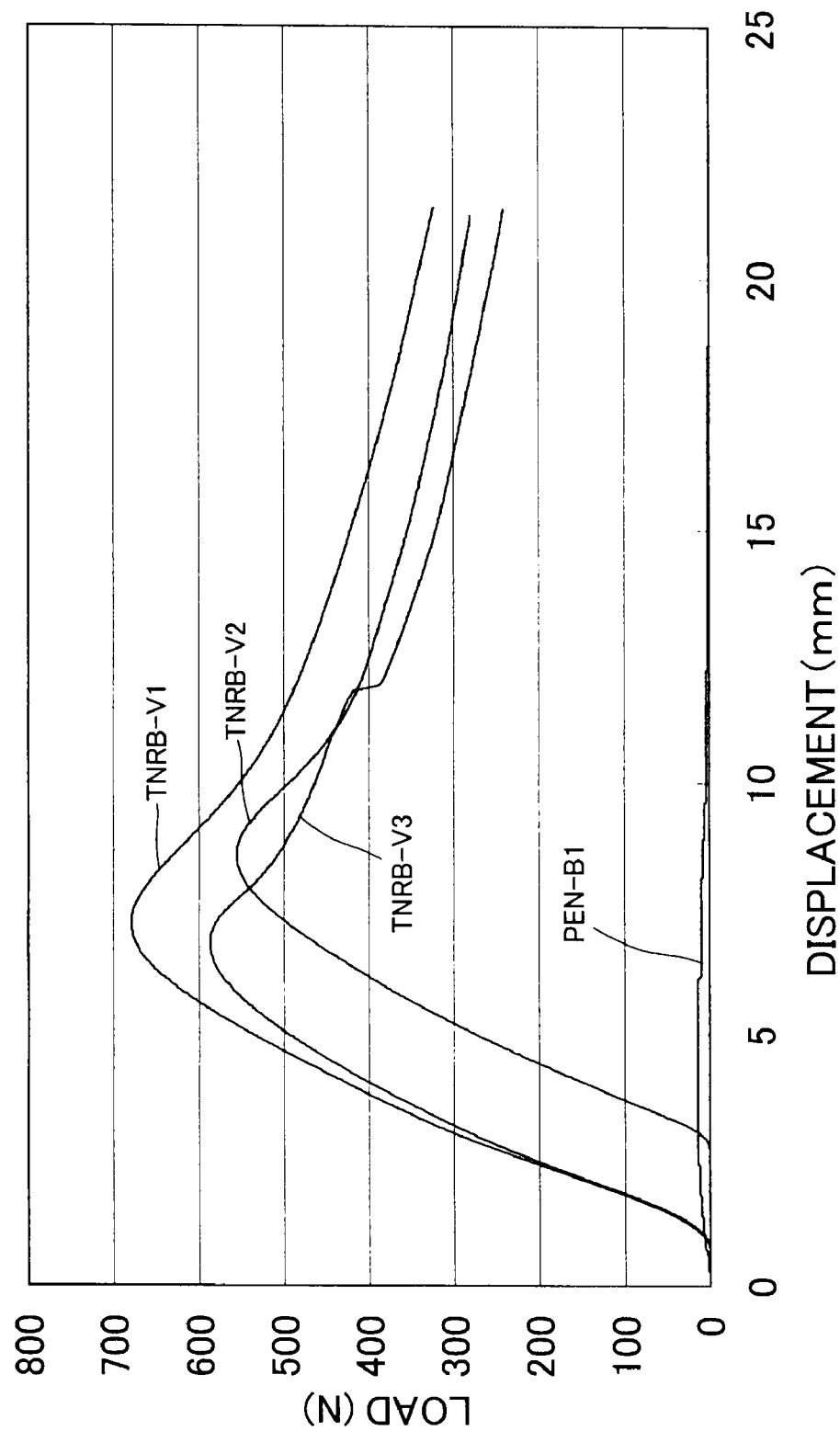
FIG. 8 is a graph showing a result of tensile tests in a bias direction of the bi-axial woven fabric single body and the tetra-axial woven fabric single body used in Test Example 1 and Test Example 2.
Figure 9:
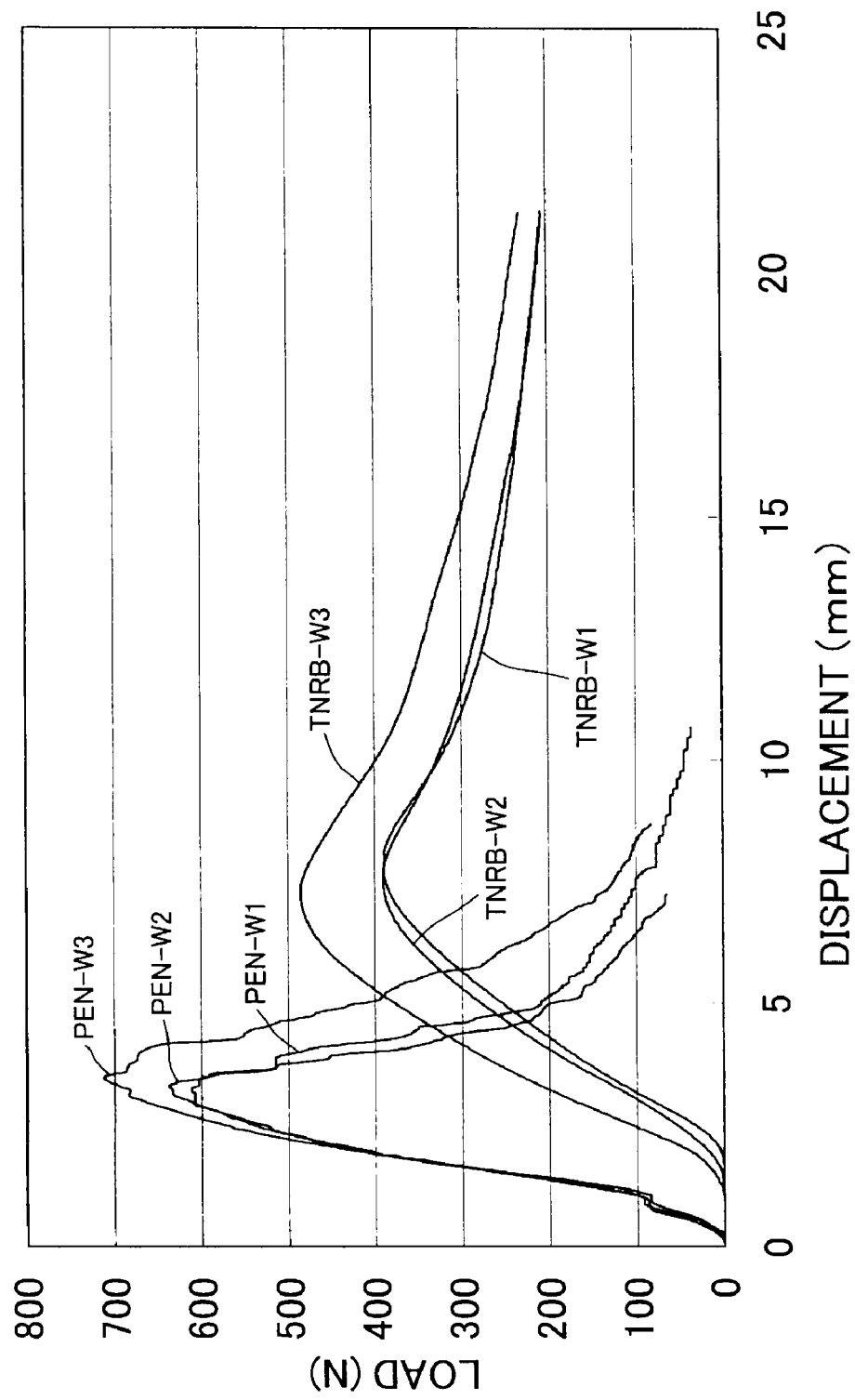
FIG. 9 is a graph showing a result of tensile tests in a widthwise direction of the bi-axial woven fabric single body and the tetra-axial woven fabric single body used in Test Example 1 and Test Example 2.

Here, regarding a bi-axial woven fabric single unit and a tetra-axial woven fabric single unit, tensile tests of respective test pieces cut out in the roll direction, in the bias direction and in the widthwise direction were performed like Test Example 1 in order to examine differences between the bi-axial woven fabric and the tetra-axial woven fabric. The results were shown in FIG. 7 to FIG. 9. Incidentally, in FIG. 7 to FIG. 9, display attached with "PEN" shows a test piece of the bi-axial woven fabric and display attached with "TNRB" shows a test piece of the tetra-axial woven fabric. First of all, in comparison about the bi-axial woven fabric, the tensile stress in the bias direction is considerably lower than the tensile stresses in the roll direction and in the widthwise direction. On the other hand, in the case of the tetra-axial woven fabric, the tensile stress in the bias direction is highest, and the tensile stresses in the roll direction and in the widthwise direction are small.

It is understood from these matters that a difference in stress exists according to the tensile direction in both the bi-axial woven fabric and the tetra-axial woven fabric. Therefore, when an impact is applied to the bi-axial woven fabric and the tetra-axial woven fabric, fibers of each woven fabric are twisted toward a weaker stress side and the twist functions as a force for the fibers to delaminate from the planar member made of synthetic resin. When the bi-axial woven fabric and the tetra-axial woven fabric are compared with each other, the former is considerably larger in difference in stress according to the tensile direction than the latter. Accordingly, upon receipt of an impact, twist of the bi-axial woven fabric is larger than that of the tetra-axial woven fabric, from which, it is understood that the bi-axial woven fabric causes delamination more easily than the tetra-axial woven fabric.

Test Example 3

A shell type frame member 31 using a laminated body (an average thickness: 2.3 mm) having the same configuration as the test piece of Test Example 1 was manufactured. The shell type frame member 31 was adopted in a seat back section 30 and a seat structure 10 (see FIG. 2 and FIG. 3) which coupled the seat back section 30 to a seat cushion section 20 via a reclining knuckle was manufactured.

A rearward moment experiment was performed using the seat structure 10. This experiment is performed by applying a rearward load to the seat back section in an assembled state of the seat structure by a back pan modeled after a back shape of a person.

Figure 10:
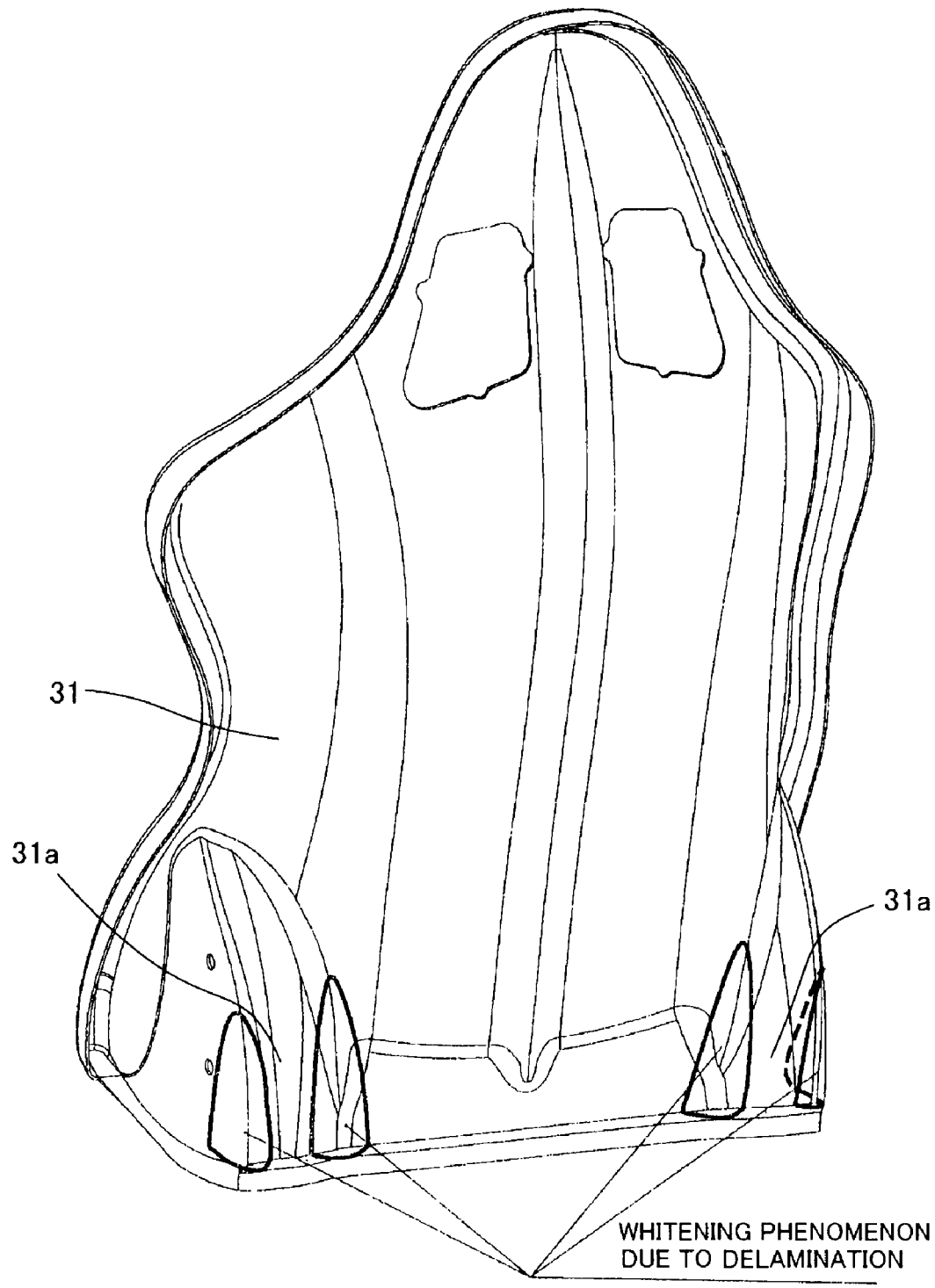
FIG. 10 is a view showing aspects of the vicinities of left and right undulation portions of the shell type frame member after a rearward moment experiment has been performed in Test Example 3.

FIG. 10 is a view showing aspects of the vicinities of left and right undulation portions 31a of a shell type frame member 31 after the rearward moment experiment. As shown in FIG. 10, it is understood that whitening was generated on the surface synthetic resin of the shell type frame member 31 in the vicinities of the undulation portions 31a and delamination was caused between the bi-axial woven fabric and the planar member made of synthetic resin which was a surface layer and between the bi-axial woven fabric and the planar member made of synthetic resin which was a lower layer without causing rupture of the bi-axial woven fabric. Accordingly, delamination is caused between the synthetic resin and the bi-axial woven fabric so that impact energy generated by an impact is absorbed by the delamination.

A rearward moment experiment similar to that of Test Example 3 was performed to a seat structure using a carbon shell where a seat back section and a seat cushion section were coupled to each other using the same reclining knuckle as adopted in the seat structure of Test Example 3 (the seat structure using the shell type frame member 31 of the present invention). A graph comparing rearward moments of the seat structure of Test Example 3 and the seat structure comprising the carbon shell is shown in FIG. 11.

Figure 11:
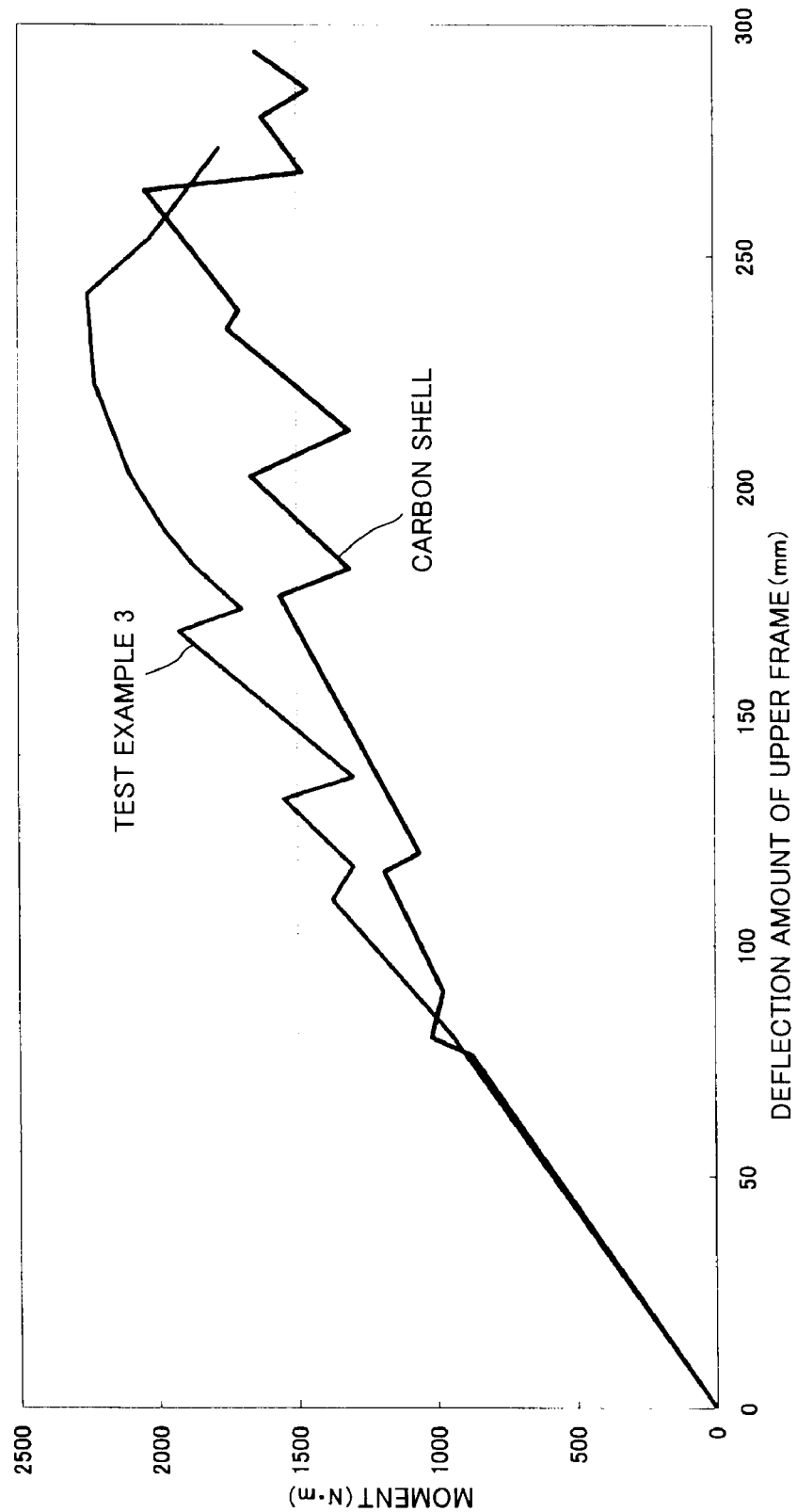
FIG. 11 is a graph showing comparison between rearward moments of a seat structure in Test Example 3 and in a seat structure comprising a carbon shell.

It is found from FIG. 11 that, though the seat structure of Test Example 3 and the seat structure comprising the carbon shell have the same strength, an absolute value of a rearward moment of the former rose higher than that of the latter and a rearward deflection amount of a frame of the former was also less than that of the latter. A difference between the both is a difference in the energy absorbing amount due to the delamination. In other words, such a phenomenon that the absolute value of the rearward moment of the seat structure of Test Example 3 rises higher than that of the seat structure comprising the carbon shell shows the fact that an impact load concentrating on the reclining knuckle becomes smaller than that of the seat structure comprising the carbon shell, and a difference between the both serves as a force causing delamination of each planar member in the laminated body to dissipate impact energy.

Test Example 4

Figure 12:
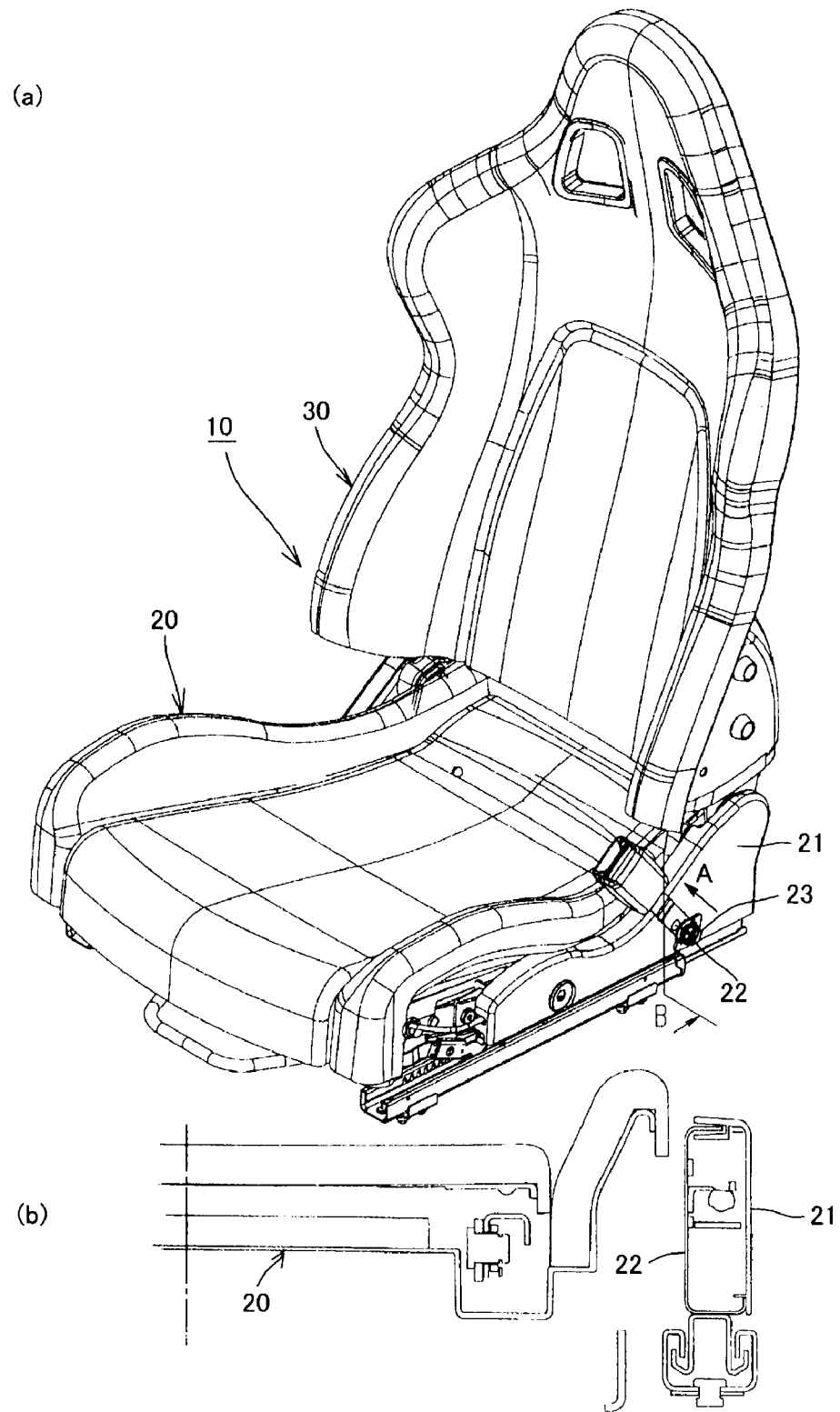
FIGS. 12A and 12B are views showing a side frame cover having an approximately L shape in section and manufactured from a laminated body in which a bi-axial woven fabric has been sandwiched between two planar members made of synthetic resin via adhesive agent.

A side frame cover 21 having an approximately L shape in section was manufactured utilizing the same laminated body as Test Example 1. As shown in FIG. 12, the side frame cover 21 was coupled to a side frame base body 22 made of an approximately U-shaped metal having a plate thickness of 1.2 mm in a face-to-face manner. A belt anchor 23 was attached to the side frame cover 21 so as to penetrate the side frame cover 21 in a thickness direction thereof, and a base portion of the seat belt 24 was fixed to the belt anchor 23 via a bolt. In such a situation, a load was applied to the seat belt 24 such that the belt anchor 23 was pulled in a direction (a direction of arrow A in FIG. 12) perpendicular to an axial direction of the belt anchor 23.

As a result, a crack did not occur in the side frame cover 21 and only such a deformation that a through-hole of the belt anchor 22 was diameter-expanded was generated. Accordingly, it was found that the laminated body obtained by sandwiching the bi-axial woven fabric used in the abovementioned embodiment between the planar members made of synthetic resin could obtain high rigidity in addition to the impact absorbing action due to the delamination action.

The invention claimed is:

1. An impact absorbing structural body comprising a laminated body obtained by laminating at least two layered planar members made of heterogeneous materials, wherein
the laminated body is comprised of planar members made of synthetic resin and a planar member made of cloth, is configured by sandwiching the planar member made of cloth between the planar members made of synthetic resin, and is configured such that, by action of delamination caused between respective layers upon receipt of an impact, both the tensile stress and the Izod impact strength of the laminated body regarding at least one tensile direction of a vertical direction, a lateral direction and an oblique direction are lowered as compared with those of a homogeneous laminated body obtained by laminating a planar member made of a homogeneous material on either of the planar members used in the laminated body, and lowering rates of the tensile stress and the Izod impact strength are 40% or less,
wherein an undulation portion is formed on the laminated body.

2. The impact absorbing structural body according to claim 1, wherein the lowering rates are in a range from 20% to 40%.

3. The impact absorbing structural body according to claim 1, wherein, as compared with the homogeneous laminated body, both the tensile strength and the Izod impact strength of the laminated body regarding all tensile directions of the vertical direction, the lateral direction and the oblique direction are lowered.

4. The impact absorbing structural body according to claim 1, wherein the planar members configuring the laminated body are joined to each other via adhesive agent.

5. An impact absorbing structural body comprising a laminated body obtained by laminating at least two layered planar members made of heterogeneous materials, wherein
the laminated body is comprised of planar members made of synthetic resin and a planar member made of cloth, is configured by sandwiching the planar member made of cloth between the planar members made of synthetic resin, and is configured such that, by action of delamination caused between respective layers upon receipt of an impact, both the tensile stress and the Izod impact strength of the laminated body regarding at least one tensile direction of a vertical direction, a lateral direction and an oblique direction are lowered as compared with those of a homogeneous laminated body obtained by laminating a planar member made of a homogeneous material on either of the planar members used in the laminated body, and lowering rates of the tensile stress and the Izod impact strength are 40% or less,
wherein the planar member made of cloth is a bi-axial woven fabric, a tri-axial woven fabric, a tetra-axial woven fabric, or a three-dimensional solid knitted fabric.

6. The impact absorbing structural body according to claim 5, wherein the planar member made of cloth is the bi-axial woven fabric.

7. The impact absorbing structural body according to claim 1, wherein the planar member made of cloth positioned at the undulation portion has a length longer than a circumferential length of a region on which the undulation portion is formed and lamination is performed in a state where an excess portion has been generated.

8. A shell type frame member in a seat structure, the shell type frame member using an impact absorbing structural body at least partially, wherein
the impact absorbing structural body comprises a laminated body obtained by laminating at least two layered planar members made of heterogeneous materials, including planar members made of synthetic resin and a planar member made of cloth, wherein the laminated body is configured by sandwiching the planar member made of cloth between the planar members made of synthetic resin, and the laminated body is configured such that, by action of delamination caused between respective layers upon receipt of an impact, both the tensile stress and the Izod impact strength of the laminated body regarding at least one tensile direction of a vertical direction, a lateral direction and an oblique direction are lowered as compared with those of a homogeneous laminated body obtained by laminating a planar member made of a homogeneous material on either of the planar members used in the laminated body, and lowering rates of the tensile stress and the Izod impact strength are 40% or less,
wherein an undulation portion is formed on the laminated body.

9. A seat structure where an impact absorbing structural body is used in at least one portion of a shell type frame member, wherein
the impact absorbing structural body comprises a laminated body obtained by laminating at least two layered planar members made of heterogeneous materials, including planar members made of synthetic resin and a planar member made of cloth, wherein the laminated body is configured by sandwiching the planar member made of cloth between the planar members made of synthetic resin, and the laminated body is configured such that, by action of delamination caused between respective layers upon receipt of an impact, both the tensile stress and the Izod impact strength of the laminated body regarding at least one tensile direction of a vertical direction, a lateral direction and an oblique direction are lowered as compared with those of a homogeneous laminated body obtained by laminating a planar member made of a homogeneous material on either of the planar members used in the laminated body, and lowering rates of the tensile stress and the Izod impact strength are 40% or less
wherein an undulation portion is formed on the laminated body.

10. The seat structure according to claim 9, which is a seat for a transport machine.

11. A shell type frame member in a seat structure, the shell type frame member using an impact absorbing structural body at least partially, wherein
the impact absorbing structural body comprises a laminated body obtained by laminating at least two layered planar members made of heterogeneous materials, including planar members made of synthetic resin and a planar member made of cloth, wherein the laminated body is configured by sandwiching the planar member made of cloth between the planar members made of synthetic resin, and the laminated body is configured such that, by action of delamination caused between respective layers upon receipt of an impact, both the tensile stress and the Izod impact strength of the laminated body regarding at least one tensile direction of a vertical direction, a lateral direction and an oblique direction are lowered as compared with those of a homogeneous laminated body obtained by laminating a planar member made of a homogeneous material on either of the planar members used in the laminated body, and lowering rates of the tensile stress and the Izod impact strength are 40% or less, wherein the planar member made of cloth is a bi-axial woven fabric, a tri-axial woven fabric, a tetra-axial woven fabric, or a three-dimensional solid knitted fabric.

12. A seat structure where an impact absorbing structural body is used in at least one portion of a shell type frame member, wherein the impact absorbing structural body comprises a laminated body obtained by laminating at least two layered planar members made of heterogeneous materials, including planar members made of synthetic resin and a planar member made of cloth, wherein the laminated body is configured by sandwiching the planar member made of cloth between the planar members made of synthetic resin, and the laminated body is configured such that, by action of delamination caused between respective layers upon receipt of an impact, both the tensile stress and the Izod impact strength of the laminated body regarding at least one tensile direction of a vertical direction, a lateral direction and an oblique direction are lowered as compared with those of a homogeneous laminated body obtained by laminating a planar member made of a homogeneous material on either of the planar members used in the laminated body, and lowering rates of the tensile stress and the Izod impact strength are 40% or less, wherein the planar member made of cloth is a bi-axial woven fabric, a tri-axial woven fabric, a tetra-axial woven fabric, or a three-dimensional solid knitted fabric.

* * * * *